United States Patent [19]

Kamigaki

[11] Patent Number: 4,746,200
[45] Date of Patent: May 24, 1988

[54] ELECTROCHROMIC DISPLAY DEVICE HAVING WHITE COUNTER ELECTRODE

[75] Inventor: Tomo'o Kamigaki, Furukawa, Japan

[73] Assignee: Alps Electric Co., Ltd., Japan

[21] Appl. No.: 863,971

[22] Filed: May 16, 1986

[30] Foreign Application Priority Data

May 16, 1985 [JP] Japan ............................... 60-105383

[51] Int. Cl.[4] .............................................. G02F 1/01
[52] U.S. Cl. ..................................................... 350/357
[58] Field of Search ......................................... 350/357

[56] References Cited

U.S. PATENT DOCUMENTS 4,411,497 10/1983 Yamanaka et al. ................. 350/357

OTHER PUBLICATIONS

Siperko et al., "Electrochemical and Spectroscopic Studies of Metal Hexacyanometalate Films", J. Electrochem. Soc.: Electrochemical Science and Technology, Feb. 1983, pp. 396–402.

Primary Examiner—Gene Wan
Assistant Examiner—James C. Lee
Attorney, Agent, or Firm—Guy W. Shoup

[57] ABSTRACT

An electrochromic display device in which an electrolyte is disposed between a display electrode and a counter electrode, and an electrochromic substance layer is formed at least to the inside of said display electrode, wherein the counter electrode comprises a layer containing a white redox substance. Since the white redox substance layer is formed to the counter electrode, white background plate is no more necessary which enables to reduce the fabrication cost and give a great feasibility for the design of ECD.

4 Claims, 2 Drawing Sheets

ELECTROCHROMIC DISPLAY DEVICE HAVING WHITE COUNTER ELECTRODE

BACKGROUND OF THE INVENTION

1. Field of the Invention

This invention concerns an electrochromic display device (hereinafter simply referred to as ECD) and, more specifically, it relates to an improvement in the counter electrode material therefor.

2. Description of the Prior Art

Recently, ECDs have been noted as the display device since they are free from view angle-dependency, capable of large area display and provide memorizable display. As the display material for ECD, inorganic material such as tungsten oxide and Prussian blue, as well as organic material such as heptylviologen dibromide have been used. The feature of ECD, in view of the operation principle, resides in the coloring/discoloring reactions of electrochromic substance (hereinafter simply referred to as EC substance) due to electrochemical reactions. In this case, it has to be noted that a reaction reverse to that on the display electrode occurs in the counter electrode. Accordingly, it is required for the counter electrode that it can stably perform effectively reversible oxidation-reduction reaction, in which less fluctuation occurs in the potential of the counter electrode itself accompanying the reaction and it rapidly tends to converge to a predetermined potential, etc.

As one of the means for satisfying such conditions, the same EC substance is formed by the same amount as in the display electrode to the counter electrode. In this case, since the reactions occurring at the two electrodes are quite opposite in the direction and equal with each other in the reaction amount, the device can be driven with ease. However, such a symmetrical type ECD has a drawback in that, if the reaction amount differs between the display electrode and the counter electrode due to external factors such as temperature change and light irradiation or internal factors such as defoliation of the display electrode, colored or discolored states are gradually accumulated along with the repeating cycles of operation, till the device can not operate at last.

As another means, a substance exhibiting stable oxidation-reduction reaction such as Prussian blue and a substance of an extremely large specific surface area such as carbon black are mixed together with a resin or like other binder and coated on the counter electrode. In this case, although a preferred ECD can be obtained, it involves a problem in view of the cell structure as in the symmetrical type ECD described above. Namely, a white background plate has to be disposed in an electrolyte between the display electrode and the counter electrode, so that the counter electrode may be consealed from the display surface. A ceramic plate or a fluoro resin molded plate of 0.2 to 0.5 mm thick has often been used as the white background plate. However, the white background plate occupies a most part of the entire cost of the ECD cell and also results in a problem that the thickness of the ECD cell can not be decreased to less than the thickness of the white background plate.

SUMMARY OF THE INVENTION

The object of this invention is to overcome the foregoing problems in the prior art and provide an ECD capable of satisfying the conditions necessary for the counter electrode and providing the counter electrode with the function of a white background plate thereby decreasing the cost and increasing the degree of freedom for the design.

The present inventors have noted that those white or pale color materials capable of performing reversible oxidation-reduction reaction and not discolored due to the reaction are prosperous as the material for providing the counter electrode with the property of carrying out the oxidation-reduction reaction, selected such materials, as well as made various studies on the method of fixing them on the electrode in such a manner that they are electrochemically active without imparing the white color and, as a result, have achieved this invention.

The feature of the ECD according to this invention resides in that the counter electrode comprises a layer containing a white redox substance. The white color means herein white or pale color.

Accordingly, since the counter electrode is of a white or pale color and does not discolor upon reaction, the white background plate indispensable so far in the conventional reflection display type ECD can be saved, by which the production cost can be reduced and the feasibility in the design of the ECD cell can be attained.

Although not particularily limited, the ECD according to this invention can take, for example, the following structure. That is, a transparent display electrode made of indium oxide, tin oxide or the like is formed on a transparent insulating substrate such as of glass and an EC substance layer made of tungsten oxide, Prussian blue or the like is further formed on the display electrode by way of a vacuum deposition or electrolytic deposition process. In this case, the display electrode or the EC substance layer may be patterned. While on the other hand, a counter electrode made of the same transparent electrode material as above or thin metal membrane is formed on a separate insulating substrate. Then, a mixture containing a white redox substance is coated to dry on the electrode to form an counter electrode substance layer. Then, the insulating substrate formed with the display electrode and the insulating substrate formed with the counter electrode are appended with each other by way of a spacer and the circumferential periphery thereof is bonded to seal by an epoxy resin or the like. An ECD is constituted by injecting a liquid electrolyte into the cell thus formed. The electrolyte usable herein can include various materials such as potassium chloride, rubidium chloride and cesium chloride, and the pH of the liquid may be adjusted as required. Since it is no more necessary to dispose a white background plate between the display electrode and the counter electrode in this invention, the thickness of the spacer can optionally be set as required.

The white redox substance in this invention has no particular restriction and a complex of mixed valency represented by the following formula (1) is preferred:

$$M_k(Fe(CN)_6)_l \qquad (1)$$

where M represents a transition metal selected from Ni, Zn, Cd and Sn, and k and l represent each a positive integer.

The oxidation-reduction potential, oxidation color and the reduction color for the complex of the mixed valency represented by the formula (1) are as shown in the table below.

TABLE

| M | Oxidation/reduction potential | Oxidation color | Reduction color |
|---|---|---|---|
| Ni | 0.62 V | pale green gray | pale blue |
| Zn | 0.80 V | white | white |
| Cd | 0.64 V | white | white |
| Sn | 0.25 V | white | white |

According to a preferred embodiment of this invention, the layer containing the white redox substance is constituted with a layer prepared by coating and drying a mixture of a white redox substance and a binder, a mixture of a white redox substance, white electroconductive powder and a binder, or a mixture of a white redox substance, white electroconductive powder, binder and a coloring substance.

The white electroconductive powder is added in the case of increasing the whiteness. As the white electroconductive powder, "W-10" (trade name, manufactured by Mitsubishi Kinzoku K.K.) prepared by coating the surface of fine titanium oxide particles with a transparent electroconductive membrane or the like can be used for instance.

The coloring substance is added in the case of providing a pale background color in order to make the color display more versatile. As the coloring substance, copper phthalocyanine (blue), chromium oxide (green) and lead chromate (yellow) can be used for instance.

As the binder, various types of resins or mixtures of resin and solvent can be used. For instance, 3% solution of polymethylmethacrylate resin in carbitol acetate can be used.

A preferred blending ratio of the mixture, for example, in the case of using a mixture of white redox substance, white electroconductive powder and binder is about from 5 to 50% by weight of white redox substance, from 0 to 60% by weight of white electroconductive powder and from 10 to 50% by weight of binder.

The layer containing the white redox substance is formed, for example, by coating and drying the above-mentioned mixture onto the counter electrode.

BRIEF DESCRIPTION OF THE ACCOMPANYING DRAWINGS

These and other objects, features, as well as advantageous effects of the invention will now be made clear apparent by reading the following descriptions for the embodiments of this invention while referring to the accompanying drawings, wherein FIG. 1 is a cross sectional view showing one embodiment of the ECD according to this invention;

DETAILED DESCRIPTION OF THE PREFERRED EMBODIMENTS

Figure 2:
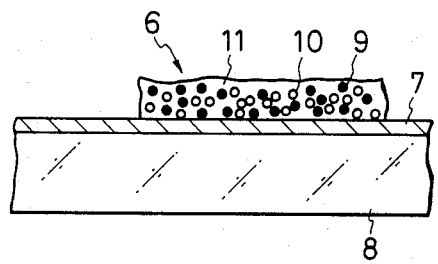
FIG. 2 is an enlarged view for a portion of the counter electrode of the ECD.

FIG. 2 shows one embodiment of a structure of the counter electrode used in the ECD according to this invention.

At first, zinc chloride and an aqueous solution of potassium ferrocyanate were mixed by the equi-molar amount. White zinc hexacyano ferrate thus obtained was filtered and dried in vacuum to obtain dry powder. Then, the zinc hexacyano ferrate 9 obtained in this way, white electroconductive powder 10 "W-10" (trade name, manufactured by Mitsubishi Kinzoku K.K.) and a binder 11 composed of 3% solution of polymethacryaltea resin (simply referred to as PMMA, trade name "Acrypet", manufactured by Mitsubishi Rayon K.K.) in carbitol were mixed to form a liquid dispersion. The liquid dispersion was taken by a spoid and added dropwise on a transparent electrode 7 of an insulating substrate 8 made of transparent glass. Then, it was dried at 100° C. for 15 minutes to form a counter electrode substance layer 6.

Figure 3:
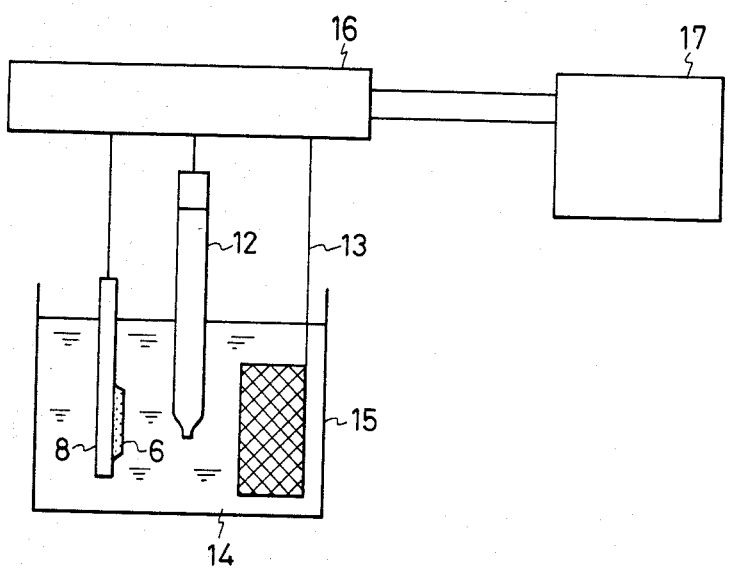
FIG. 3 is a block diagram illustrating a circuit for examining the electrochromism in the counter electrode portion as described above.
Figure 4:
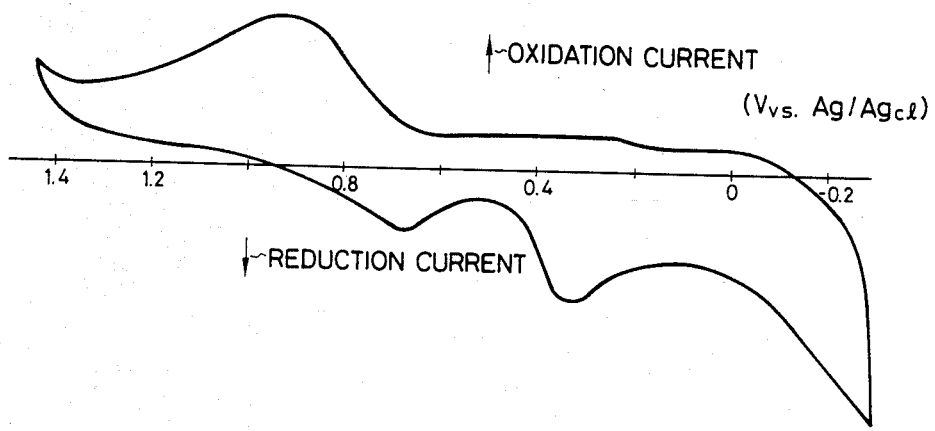
FIG. 4 is a graph showing the cyclic voltamogram by the method shown in FIG. 3.

The cyclic voltamogram was measured by using the thus obtained insulating substrate 8 on the side of the counter electrode by the 3-electrode method as shown in FIG. 3 to examine the oxidation-reduction characteristics. In FIG. 3, are shown a silver/silver chloride reference electrode 12, a platinum mesh counter electrode 13, an aqueous 0.5 mol potassium sulfate solution 14, a beaker 15, a potentiostat 16 and an X—Y recorder 17. The cyclic voltamogram thus obtained is shown in FIG. 4. As shown in the figure, a distinct oxidation-reduction peak could be obtained. In this case, color change was scarcely observed in the redox substance 6.

Figure 1:
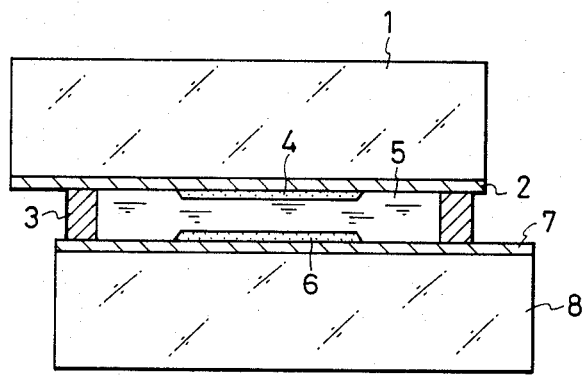

FIG. 1 shows an ECD manufactured by using the counter electrode portion shown in FIG. 2. Specifically, a display electrode 2 was formed on an insulating substrate 1 made of glass and an EC substance layer 4 made of a Prussian blue membrane was further formed on the display electrode 2. The EC substance layer 4 was prepared by immersing the display electrode 2 of the insulating substrate 1 into the equi-molar mixed solution of ferric chloride and potassium ferricynate and negatively polarizing by using the platinum electrode as the counter electrode. Then, the insulating substrate 1 on the side of the display electrode and the insulating substrate 8 on the side of the counter electrode were appended with each other by way of a spacer 3 and sealed at the circumferential periphery thereof with an epoxy resin. Further, a liquid electrolyte 5 comprising 0.5 mol aqueous solution of potassium sulfate was charged to the inside of the cell. The ECD displayed a blue color on the white background color by applying +0.2 V of voltage to the display electrode 2 based on the counter electrode 7 as a reference and showed a distinct color change in which only the white background cover could be obtained when −0.6 V of voltage was applied to the display electrode 2.

Upon forming the counter electrode substance layer 8 in the above-mentioned example, lead chromate was added as a yellow pigment to form a yellow membrane. The cyclic voltamogram for the counter electrode had no difference with that in FIG. 4. Further, the ECD cell comprising the combination with an EC substance layer 4 made of a thin Prussian blue membrane exhibited effectively reversible color change between green and yellow colors on the yellow background along with the color change in the thin Prussian blue membrane.

While zinc hexacyano ferrate was used as the white redox substance in the above-mentioned example, satisfactory results could also be obtained by the use of other white redox substances shown in the table.

As described above specifically, according to this invention, since a layer containing a white redox substance is formed in order to provide the counter electrode with the oxidation-reduction characteristics, the white background plate which was indispensable in the conventional reflection type ECD can be saved. Accordingly, it is possible to reduce the manufacturing cost and give a feasibility in the design of the ECD cell by optionally setting the cell gap. Further, by admixing the white electroconductive powder or pigment to the white redox substance, it is possible to increase the whiteness or attain versatile background colors.

What is claimed is:

1. An electrochromic display device in which an electrolyte is disposed between a display electrode and a counter electrode, and an electrochromic substance layer is formed at least to the inside of said display electrode, wherein said counter electrode comprises a layer containing a white redox substance providing a white reflection background.

2. The electrochromic display device as defined in claim 1, wherein the white redox substance is a complex of mixed valency represented by the following formula (1):

$$M_k(Fe(CN)_6)_l \qquad (1)$$

where M represents a transition metal selected from Ni, Zn, Cd and Sn, and k and l represent each a positive integer.

3. The electrochromic display device as defined in claim 1, wherein the counter electrode comprises a layer prepared by coating and drying a white redox substance, a white electroconductive powder and a binder.

4. The electrochromic display device as defined in claim 1, wherein the counter electrode comprises a layer prepared by coating and drying a white redox substance, a white electroconductive powder, a binder and a colored substance for slighting coloring said white background.

* * * * *